United States Patent
Matsugami et al.

(10) Patent No.: US 11,309,825 B2
(45) Date of Patent: Apr. 19, 2022

(54) MOTOR CONTROL DEVICE AND PROGRAMMING DEVICE

(71) Applicant: OMRON Corporation, Kyoto (JP)

(72) Inventors: Masakazu Matsugami, Ritto (JP); Ryuichi Jimbo, Kusatsu (JP)

(73) Assignee: OMRON Corporation, Kyoto (JP)

( * ) Notice: Subject to any disclaimer, the term of this patent is extended or adjusted under 35 U.S.C. 154(b) by 35 days.

(21) Appl. No.: 17/047,068

(22) PCT Filed: Apr. 26, 2019

(86) PCT No.: PCT/JP2019/018038
§ 371 (c)(1),
(2) Date: Oct. 13, 2020

(87) PCT Pub. No.: WO2019/216281
PCT Pub. Date: Nov. 14, 2019

(65) Prior Publication Data
US 2021/0159839 A1   May 27, 2021

(30) Foreign Application Priority Data

May 10, 2018   (JP) .............................. JP2018-091138

(51) Int. Cl.
*H02P 29/028* (2016.01)
*G05B 19/406* (2006.01)
(Continued)

(52) U.S. Cl.
CPC .......... *H02P 29/028* (2013.01); *G05B 19/406* (2013.01); *H02P 23/14* (2013.01); *H02P 27/06* (2013.01)

(58) Field of Classification Search
CPC ........ H02P 29/028; H02P 23/14; H02P 27/06; H02P 23/24; H02P 29/024; G05B 19/406
(Continued)

(56) References Cited

U.S. PATENT DOCUMENTS 7,667,427 B2 *   2/2010   Kamio ..................... H02P 6/12
                                                                     318/701

FOREIGN PATENT DOCUMENTS

EP         2618002      7/2013
JP        H11194830     7/1999
(Continued)

OTHER PUBLICATIONS

"International Search Report (Form PCT/ISA/210) of PCT/JP2019/018038", dated Jul. 30, 2019, with English translation thereof, pp. 1-3.
(Continued)

*Primary Examiner* — David Luo
(74) *Attorney, Agent, or Firm* — JCIPRNET

(57) ABSTRACT

Provided is a motor control device comprising a motor control unit and a safety monitoring unit. The motor control unit switches a rotation direction of a motor with respect to an input instruction in accordance with a set motor-control rotation-direction specified value. The safety monitoring unit monitors, on the basis of a position or speed of the motor, a state of the motor deviating from any one of a plurality of safety state conditions prescribed by a plurality of set safety-monitoring parameter values, and the safety monitoring unit can treat the plurality of safety-monitoring parameter values as a value of a case when the rotation direction of the motor is a first direction or as a value of a case when the rotation direction of the motor is a second direction reverse to the first direction. The motor control device has a safety function being flexible in programming.

3 Claims, 4 Drawing Sheets

(51) Int. Cl.
 *H02P 23/14* (2006.01)
 *H02P 27/06* (2006.01)
(58) Field of Classification Search
 USPC .............................. 318/400.21, 400.01, 700
 See application file for complete search history.

(56) References Cited

FOREIGN PATENT DOCUMENTS

| | | |
|---|---|---|
| JP | 2011091970 | 5/2011 |
| JP | 2017055655 | 3/2017 |
| WO | 2008101687 | 8/2008 |
| WO | 2012063352 | 5/2012 |

OTHER PUBLICATIONS

"Written Opinion of the International Searching Authority (Form PCT/ISA/237) of PCT/JP2019/018038", dated Jul. 30, 2019, with English translation thereof, pp. 1-6.
"Search Report of Europe Counterpart Application", dated Jan. 12, 2022, p. 1-p. 5.

* cited by examiner

MOTOR CONTROL DEVICE AND PROGRAMMING DEVICE

CROSS-REFERENCE TO RELATED APPLICATION

This application is a 371 application of the International PCT application serial no. PCT/JP2019/018038, filed on Apr. 26, 2019, which claims the priority benefits of Japan Patent Application No. 2018-091138, filed on May 10, 2018. The entirety of each of the above-mentioned patent applications is hereby incorporated by reference herein and made a part of this specification.

BACKGROUND

Technical Field

The invention relates to a motor control device having a safety function, and a programming device for the motor control device.

Description of Related Art

As a motor control device, there is known a device (for example, see Patent Document 1) that can switch a rotation direction of a motor with respect to an input by changing a predetermined parameter value. In addition, a motor control device having various functions (hereinafter referred to as safety function) prescribed by the international standard IEC61800-5-2 is also known, but the safety function implemented in the existing motor control device has to set the parameter value when the rotation direction of the motor is a specific direction (forward rotation direction or reverse rotation direction) as the parameter value of each safety function. Therefore, when programming the existing motor control device, even though setting the rotation direction of the motor as a direction reverse to the above characteristic direction makes it easy to program the safety function and the motor control content, the programming of the safety function has to be performed by setting the rotation direction of the motor as the above characteristic direction.

RELATED ART

Patent Document

[Patent Document 1] Japanese Laid-Open No. 2011-091970

SUMMARY

Problems to be Solved

The invention has been made in view of the current situation described above, and the invention is to provide a motor control device having a safety function that is highly flexible in programming, and a programming device suitable for the motor control device.

Means for Solving the Problems

In order to achieve the above, a motor control device according to one aspect of the invention includes: a motor control unit for controlling a motor according to an instruction that is input and switching a rotation direction of the motor with respect to the instruction according to a motor-control rotation direction specified value that has been set; and a safety monitoring unit monitoring, based on a position or speed of the motor, a state of the motor deviating from any one of a plurality of safety state conditions prescribed by a plurality of safety-monitoring parameter values that have been set. Then, the safety monitoring unit of the motor control device is configured to be capable of setting a safety-monitoring rotation direction specified value indicating whether the rotation direction of the motor is a first direction or a second direction reverse to the first direction, and is configured to operate by treating the plurality of safety-monitoring parameter values as values of a case where the rotation direction of the motor is the first direction when the safety-monitoring rotation direction specified value indicating that the rotation direction of the motor is the first direction is set, and to operate by treating the plurality of safety-monitoring parameter values as values of a case where the rotation direction of the motor is the second direction when the safety-monitoring rotation direction specified value indicating that the rotation direction of the motor is the second direction is set.

That is, both the motor control unit and the safety monitoring unit provided in the motor control device according to the above aspect of the invention are capable of switching the motor rotation direction. Therefore, the user of the motor control device can program the motor control unit (or the safety monitoring unit) by setting the rotation direction of the motor to a direction that is easy for programming, and then program the safety monitoring unit (or the motor control unit) by setting the rotation direction of the motor to the same direction. Furthermore, the user can also program the safety monitoring unit and the motor control unit by setting the rotation directions of the motor for the motor control unit and the safety monitoring unit to reverse directions.

The specific configuration of the motor control device is not particularly limited. Moreover, in order to prevent incorrect settings, a warning information output means may be added to the motor control device (the motor control unit or the safety monitoring unit of the motor control device), which when the rotation direction indicated by the motor-control rotation direction specified value and the rotation direction indicated by the motor-control rotation direction specified value do not match, that is, when the motor rotation direction specified values (motor-control rotation direction specified value, safety-monitoring rotation direction specified value) respectively set by the motor control unit and the safety monitoring unit do not match, outputs warning information indicating the same. Furthermore, such a warning information output means may be provided in a programming device for programming the motor control unit and the safety monitoring unit of the motor control device.

Effects

According to the invention, it is possible to provide a motor control device having a safety function that is highly flexible in programming, and a programming device suitable for the motor control device.

DESCRIPTION OF THE EMBODIMENTS

Hereinafter, embodiments of the invention will be described with reference to the drawings.

Figure 1:
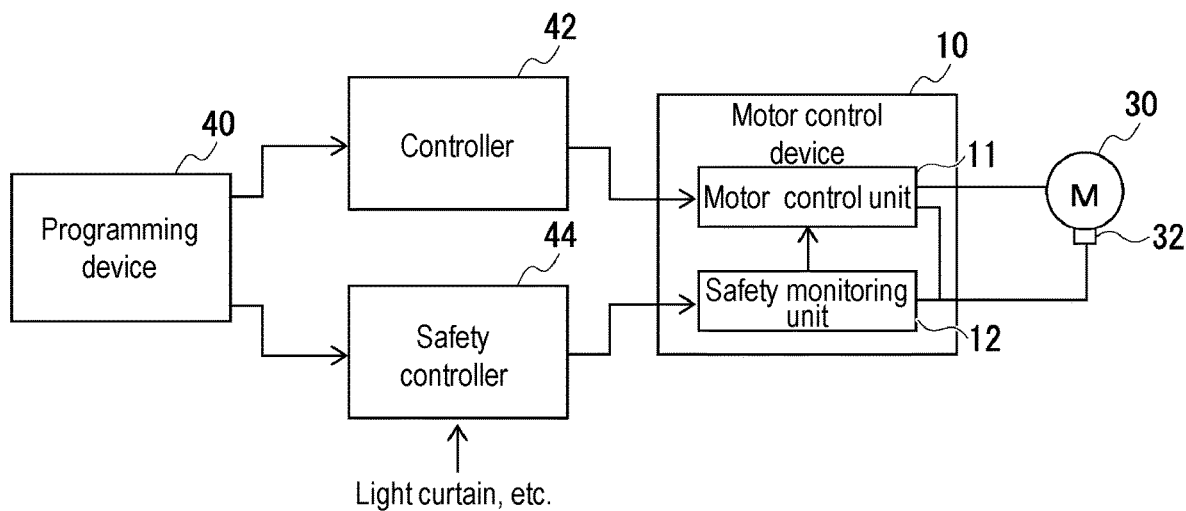
FIG. 1 is an explanatory diagram of a schematic configuration and a usage form of a motor control device according to an embodiment of the invention.

FIG. 1 shows a schematic configuration and a usage form of a motor control device 10 according to an embodiment of the invention. First, an outline of the motor control device 10 according to the present embodiment will be described using this drawing.

The motor control device 10 according to the present embodiment is a device including a motor control unit 11 and a safety monitoring unit 12. In addition, the motor control device 10 is usually used in combination with a programming device 40, a controller 42, and a safety controller 44.

The motor control unit 11 is a unit that controls a motor (three-phase motor) 30 according to an instruction input from the controller 42. The safety monitoring unit 12 is a unit having a function of safely stopping the motor 30 and a function of safely monitoring the position and motion (speed, rotation direction) of the motor 30.

A signal from an encoder 32 attached to the motor 30 is input to each of the motor control unit 11 and the safety monitoring unit 12. The encoder 32 in the present embodiment is a safety encoder that outputs a signal indicating the position and speed of the motor 30 (the rotational position and rotational speed of a rotation shaft of the motor 30). However, the encoder 32 may be a safety encoder that outputs a signal from which the position and speed of the motor 30 are obtained.

Moreover, although not shown, a current sensor for detecting a current value of each phase flowing through the motor 30 is provided in the motor control device 10, and an output of each current sensor is also input to the motor control unit 11.

The safety controller 44 is a device that stops the operation of the motor control unit 11 via the safety monitoring unit 12 in an emergency, based on a signal from a light curtain, an emergency stop switch, or the like. The safety controller 44 also performs ON/OFF control of each safety function (details will be described later) of the safety monitoring unit 12.

The programming device 40 is a device used by a user to program the operation contents of the controller 42, the safety controller 44, and the safety monitoring unit 12. Usually, a computer in which application software for programming the controller 42, the safety monitoring unit 12, etc. is installed is used as the programming device 40.

Hereinafter, the configuration and operation of the motor control device 10 will be specifically described.

[Motor Control Unit 11]

Figure 2:
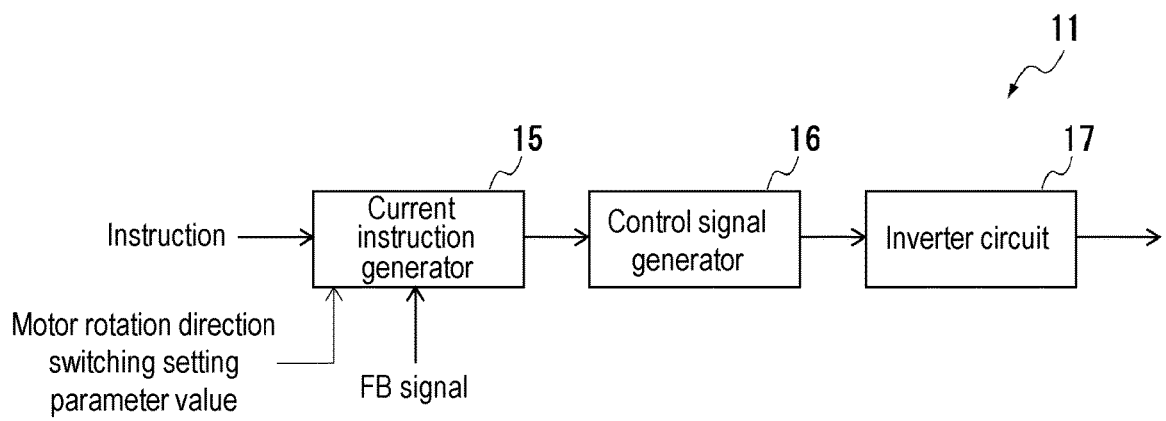
FIG. 2 is a functional block diagram of a motor control unit included in the motor control device according to the embodiment.

FIG. 2 shows a functional block diagram of the motor control unit 11. As shown, the motor control unit 11 includes a current instruction generator 15, a control signal generator 16, and an inverter circuit 17. The inverter circuit 17 is a circuit capable of outputting a three-phase alternating current, which is configured by combining a plurality of semiconductor switching elements (MOSFET, IGBT, etc.), etc. The motor control unit 11 may use an IPM (Intelligent Power Module) as a component or may be realized as an IPM.

The current instruction generator 15 is a functional block that generates a current instruction (current instructions for U phase, V phase, and W phase) for operating the motor 30 according to an instruction from the controller 42 based on the instruction from the controller 42 and a feedback signal (FB signal). The feedback signal refers to a signal indicating the measurement result of the current value of each phase flowing through the motor 30 and the detection result of the position and speed of the motor 30 obtained by the encoder 32.

The current instruction generator 15 is configured to be capable of setting (changing) the value of a motor rotation direction switching setting parameter. The motor rotation direction switching setting parameter is a parameter for switching the rotation direction of the motor 30 with respect to the input. More specifically, the motor rotation direction switching setting parameter is a parameter that can set a value specifying that the motor 30 is rotated in the rotation direction according to the input instruction, and a value specifying that the motor 30 is rotated in the direction reverse to the input instruction. The current instruction generator 15 generates a current instruction for rotating the motor 30 in the direction determined by the set value of the motor rotation direction switching setting parameter and the instruction from the controller 42.

The control signal generator 16 is a functional block that generates a control signal (PWM signal) for each semiconductor switch in the inverter circuit 17 from each current instruction generated by the current instruction generator 15.

[Safety Monitoring Unit 12]

The safety monitoring unit 12 (FIG. 1) is a unit configured to have a monitoring function of monitoring the position and speed of the motor 30 (SS2, SOS, SLP, SLS, SDI), a function of shutting off the power of the motor 30 (STO, SS1), and a safety output function of stopping the motor using a Safety brake (SBC), and to satisfy a predetermined safety level (SIL2 in the present embodiment).

Each safety function (SS2, STO, SBC, etc.) of the safety monitoring unit 12 is a function prescribed by the international standard IEC61800-5-2. Although each monitoring function (SS2, SOS, SLP, SLS, SDI) in the above safety function has different specific contents, basically, it is a function of monitoring (detecting) that the state of the motor 30 deviates from the safety state condition prescribed by the parameter value for each monitoring function, based on the position or speed of the motor 30.

A process that the safety monitoring unit 12 performs to implement each monitoring function has essentially the same content as the process conventionally performed to implement each monitoring function. However, the safety monitoring unit 12 is configured to be capable of specifying (changing) the correspondence relationship between the positive/negative of the set values of various parameters that specify the content of each monitoring function and the rotation direction of the motor 30.

Hereinafter, the configuration and operation of the safety monitoring unit 12 will be described more specifically. As already explained, the safety monitoring unit 12 is configured to satisfy a predetermined safety level, but the configuration adopted in the safety monitoring unit 12 to satisfy the safety level is the same as the one generally used.

Therefore, hereinafter, description of the configuration adopted in the safety monitoring unit 12 to satisfy the safety level is omitted.

Figure 3:
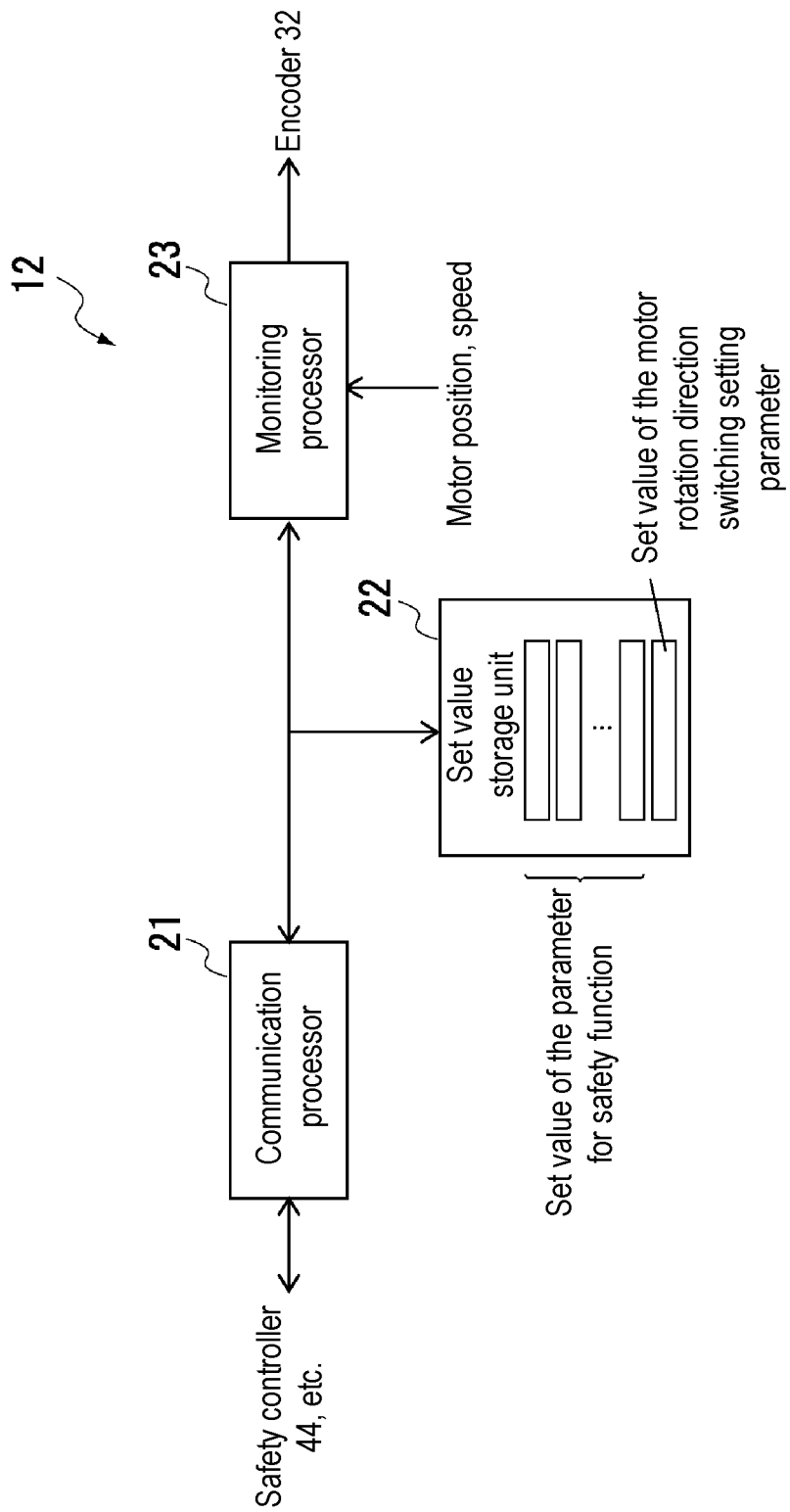
FIG. 3 is a functional block diagram of a safety monitoring unit included in the motor control device according to the embodiment.

FIG. 3 shows a functional block diagram of the safety monitoring unit 12. As shown, the safety monitoring unit 12 includes a communication processor 21, a set value storage unit 22, and a monitoring processor 23.

The communication processor 21 is a functional block for communicating with other devices (controller 42, safety controller 44, etc.). The set value storage unit 22 is a volatile memory for storing the values of various parameters set by the user (the administrator of the motor control device 10, etc.) through an operation on the programming device 40. The set value storage unit 22 stores the motor rotation direction switching setting parameter value in addition to the parameter value for each safety function. The specific use of the motor rotation direction switching setting parameter value will be described later, but the motor rotation direction switching setting parameter is set to a value indicating that the rotation direction of the motor 30 is the forward rotation direction or a value indicating that the rotation direction of the motor 30 is the reverse rotation direction. The safety monitoring unit 12 receives each parameter value stored in the set value storage unit 22 from the controller 42 every time a safe communication is established, and confirms the accuracy of each parameter value by a CRC (Cyclic Redundancy Check) value from the safety controller 44.

The monitoring processor 23 is a functional block that realizes each safety function whose content is specified by various set values stored in the set value storage unit 22 by using the position and speed of the motor 30 from the encoder 32 if necessary.

The monitoring processor 23 has a first operation mode and a second operation mode as the operation modes. The first operation mode is an operation mode of operating by interpreting the parameter value set with respect to each safety function (mainly, monitoring function) as a value when the rotation direction of the motor 30 is the forward rotation direction. The second operation mode is an operation mode of operating by interpreting the parameter value set with respect to each safety function as a value when the rotation direction of the motor 30 is the reverse rotation direction. "Interpreting the parameter value as that the rotation direction of the motor 30 is the forward rotation direction (reverse rotation direction)" means "interpreting the parameter value related to the position as a value set to increase by the forward rotation (reverse rotation) of the motor 30, and interpreting the parameter value related to the speed as a value set as the forward rotation (reverse rotation) speed of the motor 30".

Figure 4:
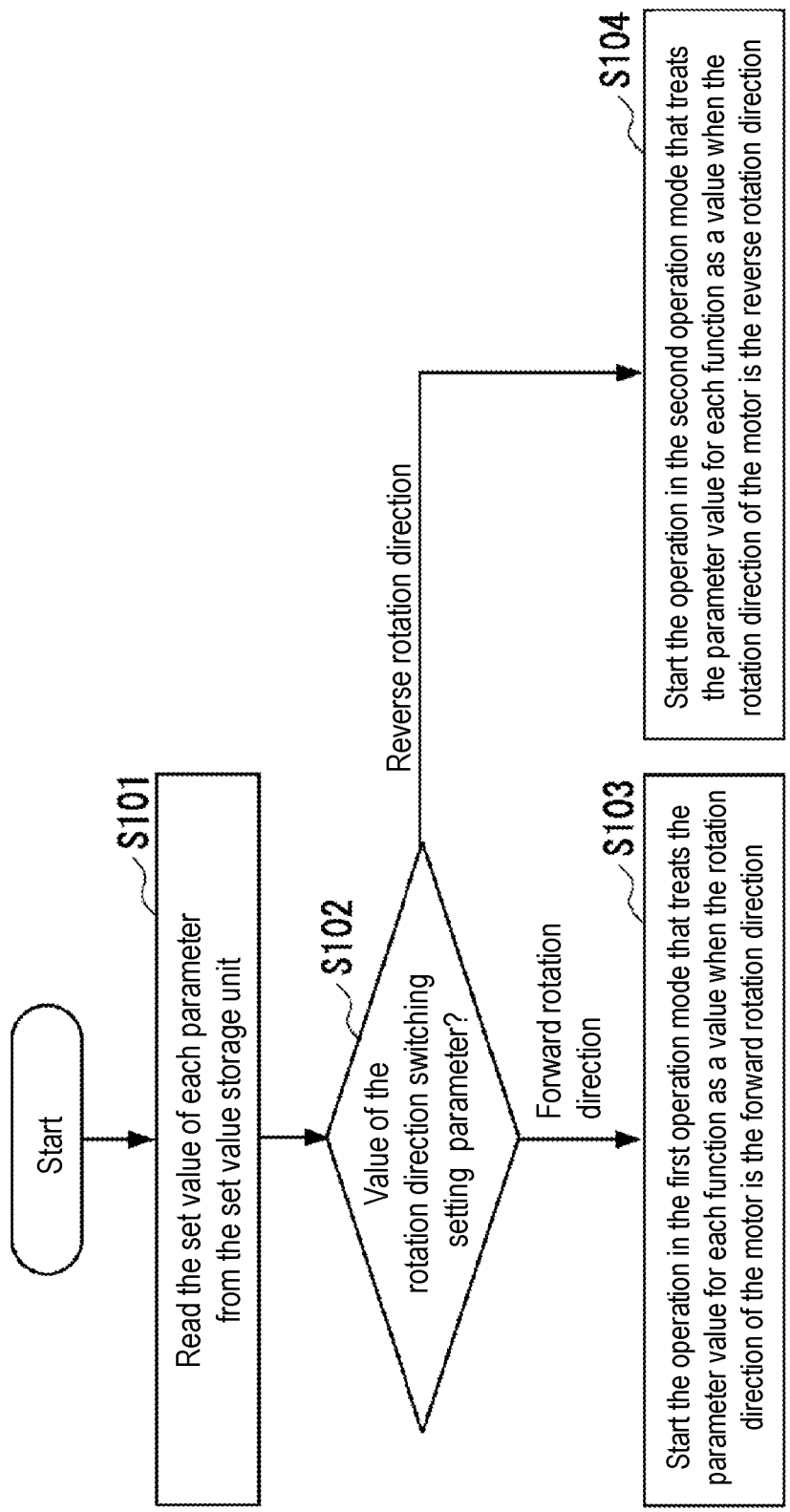
FIG. 4 is a flowchart of an operation mode selection process executed by the safety monitoring unit (monitoring processor).

Further, the monitoring processor 23 is configured to perform an operation mode selection process in the procedure shown in FIG. 4 when various parameter values related to the safety function are set/changed.

That is, the monitoring processor 23 that started the operation mode selection process by setting/changing various parameter values related to the safety function first reads the set values of various parameters including the motor rotation direction switching setting parameter from the set value storage unit 22 (step S101). Next, the monitoring processor 23 determines whether the set value of the motor rotation direction switching setting parameter is a value indicating that the rotation direction of the motor 30 is the forward rotation direction or a value indicating that the rotation direction of the motor 30 is the reverse rotation direction (step S102).

Then, the monitoring processor 23 starts the operation in the above-described first operation mode when the set value of the motor rotation direction switching setting parameter is a value indicating that the rotation direction of the motor 30 is the forward rotation direction (step S102; forward rotation direction) (step S103). In addition, the monitoring processor 23 starts the operation in the above-described second operation mode when the set value of the motor rotation direction switching setting parameter is a value indicating that the rotation direction of the motor 30 is the reverse rotation direction (step S102; reverse rotation direction) (step S104).

As described above, both the motor control unit 11 and the safety monitoring unit 12 included in the motor control device 10 according to the present embodiment are capable of switching the motor rotation direction. Therefore, the user of the motor control device 10 can program the motor control unit 11 (or the safety monitoring unit 12) by setting the rotation direction of the motor 30 to a direction that is easy for programming, and then program the safety monitoring unit 12 (or the motor control unit 11) by setting the rotation direction of the motor 30 to the same direction. Furthermore, the user can also program the safety monitoring unit 12 and the motor control unit 11 by setting the rotation directions of the motor 30 for the motor control unit 11 and the safety monitoring unit 12 to reverse directions.

Figure 5:
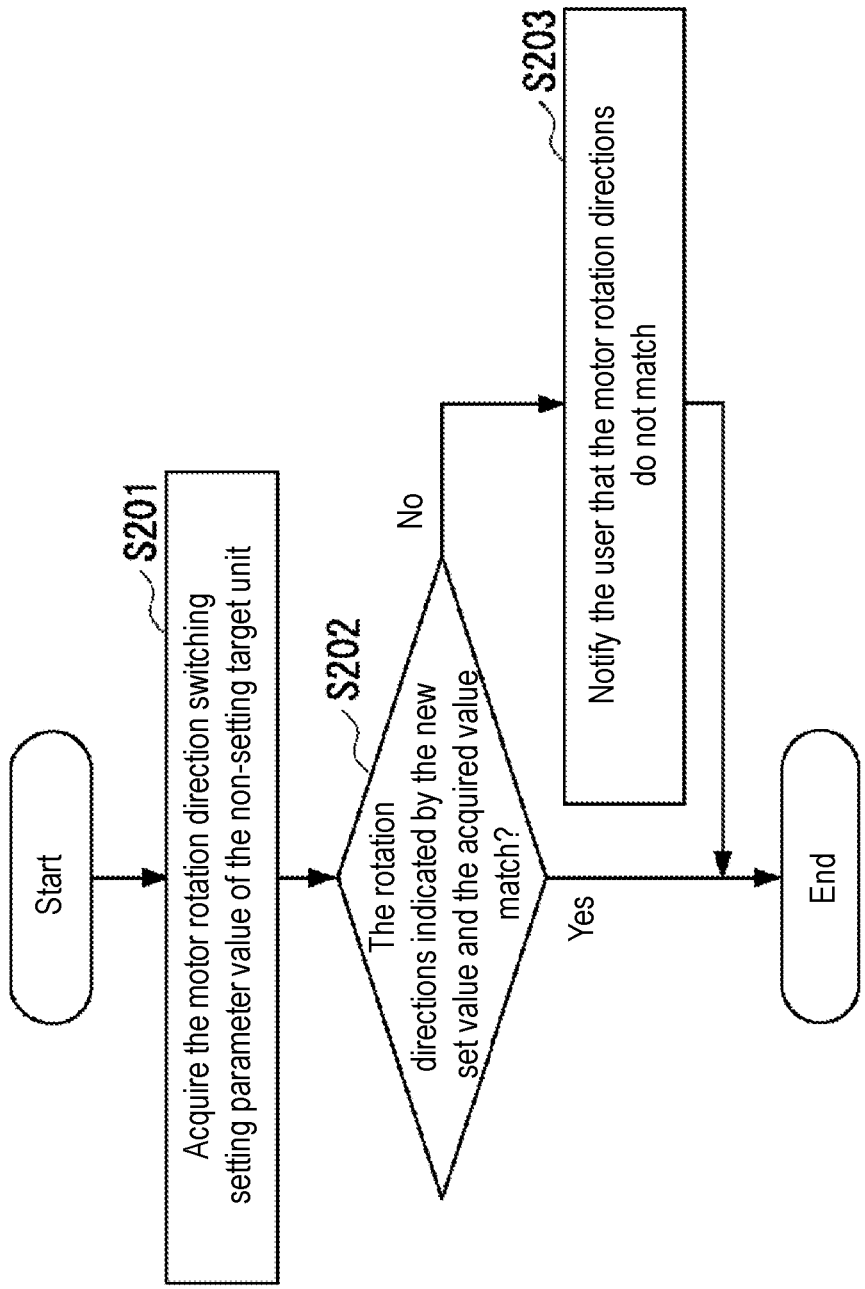
FIG. 5 is a flowchart of a consistency confirmation process executed by a programming device.

In many cases, it is better to set the rotation directions of the motor 30 during programming of the motor control unit 11 and the safety monitoring unit 12 to the same direction. Therefore, the programming device 40 (application software for the programming device 40) is configured (created) to perform a consistency confirmation process in the procedure shown in FIG. 5 when an operation of setting a value to the motor rotation direction switching setting parameter of the motor control unit 11 or the safety monitoring unit 12 is performed.

That is, when an operation of setting a value (hereinafter referred to as new set value) to the motor rotation direction switching setting parameter of the motor control unit 11 or the safety monitoring unit 12 is performed, the programming device 40 first acquires the value of the motor rotation direction switching setting parameter set in a non-setting target unit (step S201). Here, the non-setting target unit refers to a unit (the motor control unit 11 or the safety monitoring unit 12) which is not the setting target of the motor rotation direction switching setting parameter value in the motor control device 10.

Next, the programming device 40 determines whether the rotation directions of the motor 30 indicated by the acquired value and the new set value match (step S202). Then, if the rotation directions of the motor 30 indicated by the acquired value and the setting request value do not match (step S202; NO), the programming device 40 notifies the user that the rotation directions of the motor 30 do not match (the settings may be incorrect) by displaying predetermined information on a display of the programming device 40 (step S203). Then, the programming device 40 ends the consistency confirmation process.

Further, if the rotation directions of the motor 30 indicated by the acquired value and the setting request value match (step S202; YES), the programming device 40 ends the consistency confirmation process without performing any particular process.

<Modification>

The above-described motor control device 10 can be modified in various ways. For example, the safety monitoring unit 12 of the motor control device 10 may be modified into a unit having a safety function other than the safety function described above. In addition, a function may be added to the motor control device 10, which when a motor rotation direction switching setting parameter value different from the motor rotation direction switching setting parameter value set in one unit (the motor control unit 11 or the safety monitoring unit 12) is set in the other unit, transmits information indicating the same to other devices (the programming device 40, etc.).

The consistency confirmation process (FIG. 5) may be modified into a process that is started by an instruction of the user. When the consistency confirmation process is modified into a process started by an instruction of the user, if the rotation directions match (step S202; YES), it is preferable to perform a process for notifying the user of the same.

APPENDIX

1. A motor control device (10) for controlling a motor (30) according to an instruction that is input, comprising:
    a motor control unit (11) switching a rotation direction of the motor (30) with respect to the instruction according to a motor-control rotation direction specified value that has been set; and
    a safety monitoring unit (12) monitoring, based on a position or speed of the motor (30), a state of the motor (30) deviating from any one of a plurality of safety state conditions prescribed by a plurality of safety-monitoring parameter values that have been set,
    wherein the safety monitoring unit is configured to be capable of setting a safety-monitoring rotation direction specified value indicating whether the rotation direction of the motor (30) is a first direction or a second direction reverse to the first direction, and is configured to operate by treating the plurality of safety-monitoring parameter values as values of a case where the rotation direction of the motor (30) is the first direction when the safety-monitoring rotation direction specified value indicating that the rotation direction of the motor (30) is the first direction is set, and to operate by treating the plurality of safety-monitoring parameter values as values of a case where the rotation direction of the motor (30) is the second direction when the safety-monitoring rotation direction specified value indicating that the rotation direction of the motor (30) is the second direction is set.

DESCRIPTIONS OF REFERENCE NUMERALS 10 motor control device
11 motor control unit
12 safety monitoring unit
15 current instruction generator
16 control signal generator
17 inverter circuit
21 communication processor
22 set value storage unit
23 monitoring processor
30 motor
32 encoder
40 programming device
42 controller
44 safety controller

What is claimed is:

1. A motor control device for controlling a motor according to an instruction that is input, comprising:
    a motor control unit switching a rotation direction of the motor with respect to the instruction according to a motor-control rotation direction specified value that has been set; and
    a safety monitoring unit monitoring, based on a position or speed of the motor, a state of the motor deviating from any one of a plurality of safety state conditions prescribed by a plurality of safety-monitoring parameter values that have been set,
    wherein the safety monitoring unit is configured to be capable of setting a safety-monitoring rotation direction specified value indicating whether the rotation direction of the motor is a first direction or a second direction reverse to the first direction, and is configured to operate by treating the plurality of safety-monitoring parameter values as values of a case where the rotation direction of the motor is the first direction when the safety-monitoring rotation direction specified value indicating that the rotation direction of the motor is the first direction is set, and to operate by treating the plurality of safety-monitoring parameter values as values of a case where the rotation direction of the motor is the second direction when the safety-monitoring rotation direction specified value indicating that the rotation direction of the motor is the second direction is set.

2. The motor control device according to claim 1, further comprising:
    a warning information output means, which when the rotation direction indicated by the motor-control rotation direction specified value and the rotation direction indicated by the safety-monitoring rotation direction specified value do not match, outputs warning information indicating the same.

3. A programming device for programming the motor control unit and the safety monitoring unit of the motor control device according to claim 1, comprising:
    a warning information output means, which when the rotation direction indicated by the motor-control rotation direction specified value and the rotation direction indicated by the safety-monitoring rotation direction specified value do not match, outputs warning information indicating the same.

* * * * *